Figure 3:
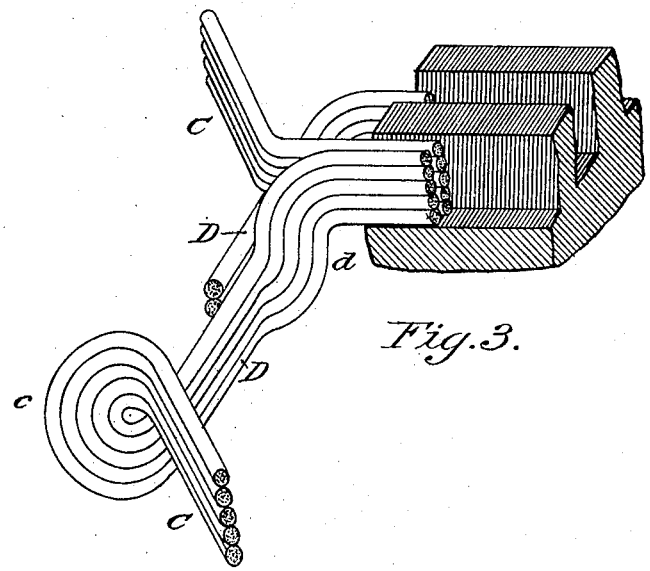

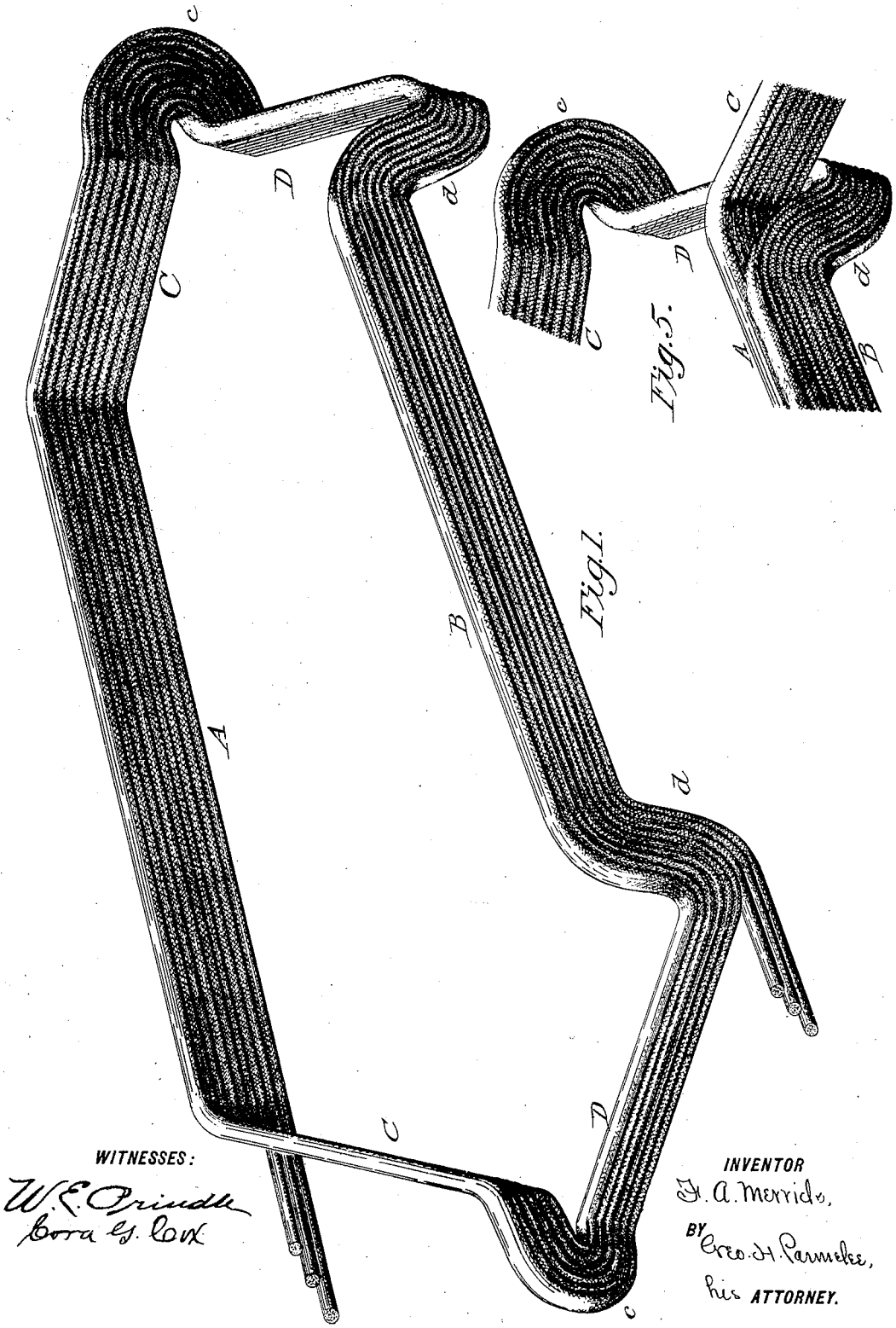

No. 759,900. PATENTED MAY 17, 1904.
F. A. MERRICK.
ARMATURE WINDING.
APPLICATION FILED OCT. 25, 1900.

NO MODEL. 3 SHEETS—SHEET 2.

WITNESSES:

INVENTOR,
F. A. Merrick
BY
Geo. H. Parmelee,
his ATTORNEY.

No. 759,900. PATENTED MAY 17, 1904.
F. A. MERRICK.
ARMATURE WINDING.
APPLICATION FILED OCT. 25, 1900.
NO MODEL. 3 SHEETS—SHEET 3.

WITNESSES:
W. E. Grindle
Bora S. Cox

INVENTOR
F. A. Merrick,
BY Geo. H. Parmelee,
his ATTORNEY.

No. 759,900. Patented May 17, 1904.

UNITED STATES PATENT OFFICE.

FRANK A. MERRICK, OF JOHNSTOWN, PENNSYLVANIA, ASSIGNOR, BY MESNE ASSIGNMENTS, TO WESTINGHOUSE ELECTRIC AND MANUFACTURING COMPANY, OF PITTSBURG, PENNSYLVANIA, A CORPORATION OF PENNSYLVANIA.

ARMATURE-WINDING.

SPECIFICATION forming part of Letters Patent No. 759,900, dated May 17, 1904.

Application filed October 25, 1900. Serial No. 34,280. (No model.)

*To all whom it may concern:*

Be it known that I, FRANK A. MERRICK, of Johnstown, in the county of Cambria and State of Pennsylvania, have invented a new and useful Improvement in Armature-Windings, of which the following is a full, clear, and exact description, reference being had to the accompanying drawings, which form a part of this specification.

My invention has relation to coils or windings for the armatures of dynamo-electric machines, and is designed to provide a novel form of separable coil capable of being preconstructed upon a suitable former and then applied to an armature-core, in conjunction with other similar coils, to form a complete winding.

My invention is more particularly intended to provide a simple form of coil of this type which can be assembled with other similar coils upon a suitable core to form a winding in which the active portions or sides of each coil are equally distant from the axis of the armature—that is to say, in the same circumferential plane or layer as distinguished from those coils which have one side in one layer and the other side in a different layer. Coils of the present type are commonly termed "unilayer" coils by reason of the fact above stated that both sides are in the same layer, although, if desired, two or more layers of the coils may be used to form a complete winding. In the preferred form of winding hereinafter described but one layer of coils is employed, and these are so arranged that the total number of coils is equal to the number of slots in the core, each side of each coil lying side by side in a core-slot with one side of another coil. This arrangement is a compact and satisfactory one inasmuch as the conductors in the several coils are so disposed as to occupy substantially the same relation to the metal of the core, thereby securing a more uniform self-induction and a correspondingly greater uniformity of commutation. Other arrangements of the coils to form a complete winding may, however, sometimes be preferable, as where it is desired to have but one coil side per slot or superimpose one layer of coils upon another.

A further object of the invention is to so dispose and shape the end or connecting portions of the coils that they will occupy a minimum amount of space at the ends of the core and will at the same time be separated each from its neighbors by interspaces amply sufficient for ventilation and to prevent danger of injury to insulation.

The essentially novel and important feature of my improved coil consists in making the end connections of each coil with two bends or offsets in substantially radial directions, so that each end portion has two parts which lie entirely in different planes. These planes are preferably substantially circumferential, one plane being substantially that of the sides of the coil and the other being an inner and substantially concentric plane. By extending these two parts obliquely in their respectively planes the end portions may be made to over and under lie each other in a symmetrical and regular manner in a minimum amount of space and without interference with each other.

My invention also consists in the novel construction and combination of parts, all as hereinafter described, and pointed out in the appended claims.

The precise nature of my invention and the manner in which the coils are assembled upon an armature-core to form a complete winding will be better understood by reference to the accompanying drawings, in which—

Figure 2:
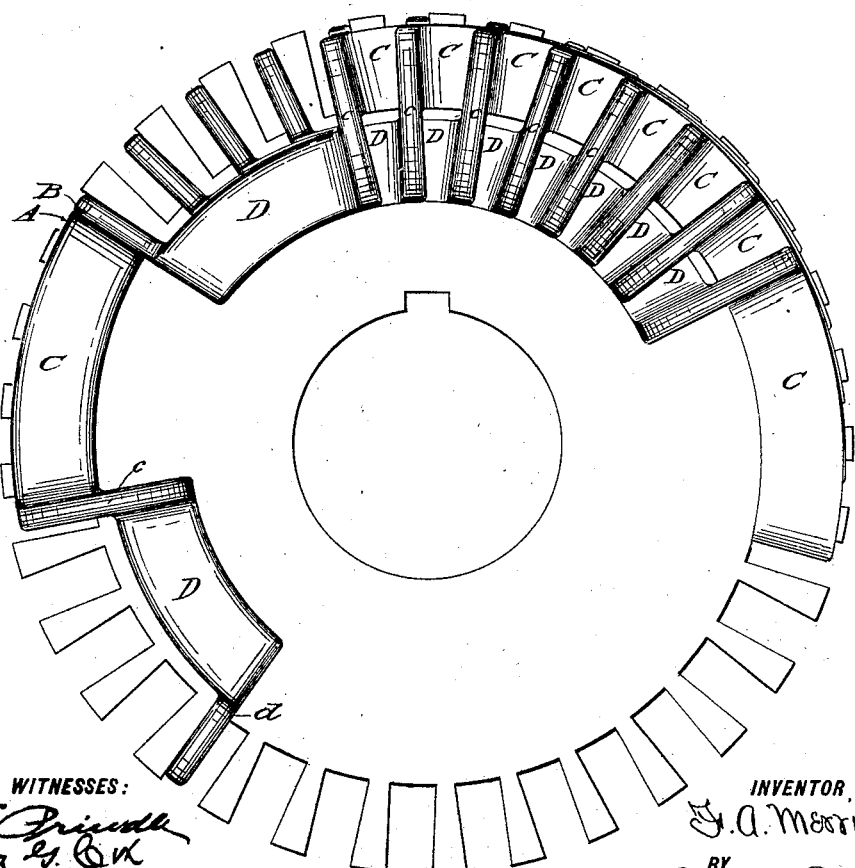
Figure 6:
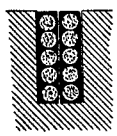
Figure 4:
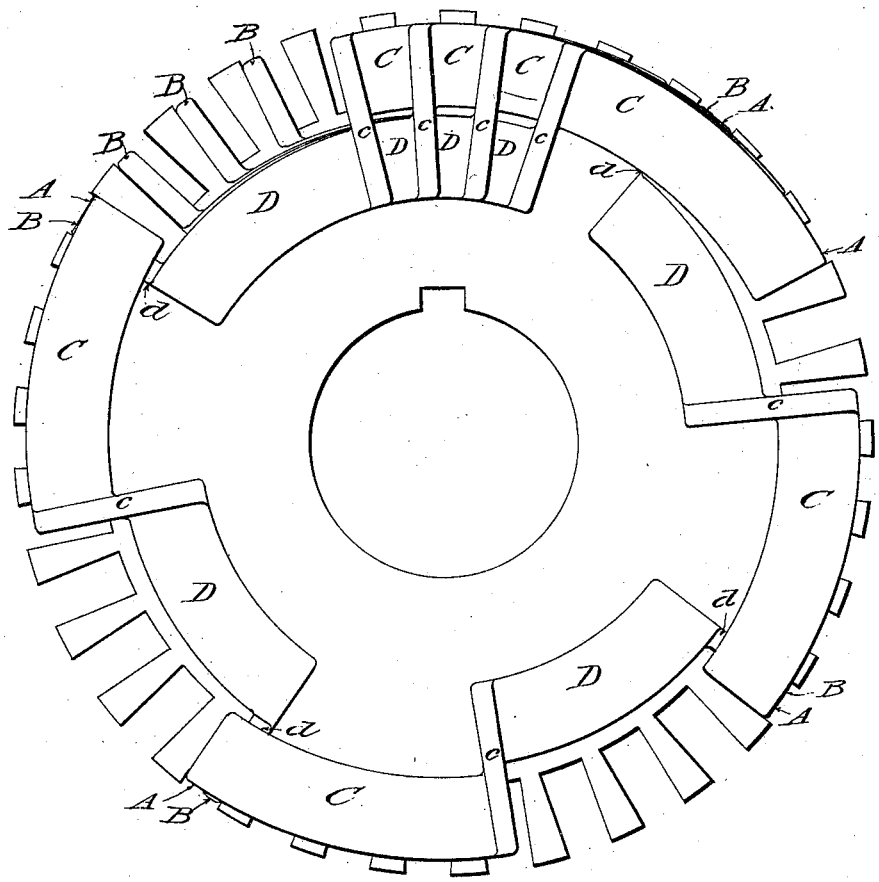

Figure 1 is a perspective view of one of my improved coils; Fig. 2, an end view of a drum-armature, showing a number of the coils applied thereto; Fig. 3, a fragmentary perspective view showing more clearly the disposition of the end connections. Figs. 4 and 5 are views similar, respectively, to Figs. 2 and 3, but illustrating a slightly-different arrangement of the coils. Fig. 6 is a section across one of the core-slots, showing the coils in place therein.

In the figures the letters A and B designate the two sides or working portions of my improved coil. This coil is composed of a plurality of turns or individual conductors wound one over another, so that the thickness of each of the sides A and B is equal to the thickness of the conductor plus its insulation and its depth is equal to or a little less than the depth of the slot which it is to occupy. The ends of each coil consist each of the two oblique portions C and D of the same thickness as the sides, connected by a radial offset $c$, and a reverse radial offset $d$ connecting the portion D to the side B. The portion C is in the plane of the side A, from which it extends obliquely outward and across the end of the core to the offset $c$, and the portion D is in a relatively inner plane separated from the plane of the portion C to the extent of the offset $c$. In making this offset $c$ the conductors are so bent that the upper conductor of the portion C becomes the lower conductor of the portion D, as clearly shown in the drawings. The reverse offset $d$ is equal in length to the length of the offset $c$, whereby the two sides A and B are, as before stated, equidistant from the axis of the armature or in the same cylindric plane.

In Figs. 2 and 4 I have shown the portions C and D as being curved to correspond approximately to the curvature of the core, whereby the portion C is in the cylindrical plane of the side A and the portion D is in a parallel plane of lesser radius, the difference in the radii of the two planes measured from the center being approximately equal to the depth of the coil. This arrangement is preferred, as economizing somewhat in end space, but is not essential to the invention, since the planes of said portions C and D may obviously be chordal planes, as shown in Fig. 1.

The manner in which the coils are assembled upon the armature will be readily understood from Fig. 2. This figure illustrates a four-pole armature, and each coil is accordingly arranged to span approximately one-fourth of its circumference; but it will be obvious that my invention is not limited to any particular polar arrangement.

In each slot is placed the side A of one coil and side by side therewith the side B of a second coil, the oblique portions C lying one within another in an outer plane and the oblique portions D being similarly disposed in an inner plane, the offsets at $c$ and $d$, combined with the oblique disposition of said portions C and D, making this arrangement possible continuously around the drum until each slot has two coils therein.

For the sake of clearness I have shown but comparatively few of the coils in Fig. 2.

In the coil arrangement shown in Figs. 2 and 3 I have shown the two sides of each coil as abutting opposite sides of their respective slots; but, if desired, the coils may be disposed as indicated in Figs. 4 and 5, in which case the two sides of each coil abut the distant sides of their respective slots. The difference between these two dispositions of the coils will be clearly understood by comparing Figs. 2 and 3 with Figs. 4 and 5. The shape of the coil is the same for both arrangements; but the circumferential dimensions are of course different, the outside dimension of the coil in the first arrangement being the inside dimension of the coil for the second arrangement. The latter arrangement also causes the portions C and D of the two coils of each slot to cross each other as they leave the slot.

It will be noted that owing to the edgewise disposition of the end connections the latter occupy a minimum amount of space at the ends of the core and each is separated from its neighbors by a space substantially equal to the distance between centers of adjacent core-slots. This insures ample ventilation and obviates all crowding and binding of the coils. It will also be noted that all the conductors of all the coils occupy substantially the same relation to the metal of the core, whereby greater uniformity in commutation is obtained. My invention is not, however, strictly limited to this feature, since the coils may be made the thickness of two or more conductors arranged side by side by correspondingly increasing the width of the core-slots or by using conductors of less diameter. In fact, the conductors can be arranged in various ways, so as to give the sides of the coil any desired cross-section, the various methods of winding being well known in the art, and, as hereinbefore indicated, each slot may contain but a single coil side or two or more layers of coils may be superimposed one upon the other.

Having thus described my invention, what I claim, and desire to secure by Letters Patent, is—

1. An armature-coil, having its two sides equidistant from the axis of the armature, and its ends having each two reverse oblique portions disposed in different planes.

2. An armature-coil, having its two sides equidistant from the axis of the armature, and each of a width equal to one-half the width of the core-slot which it is to occupy, and its ends disposed each in two different planes offset radially one from the other.

3. An armature-coil, having its two sides equidistant from the axis of the armature, and its ends consisting each of two reversely-directed oblique portions, one of which is in the plane of its adjacent side, and the other of which is in a different and inner plane.

4. An armature-coil, having its two sides equidistant from the axis of the armature, and its ends consisting each of two reversely-directed portions, one of which is in the plane of its adjacent side, and the other of which is in a different and inner plane, said portions being connected to each other by a radial offset, and the last-named portion being connected to its adjacent side by a corresponding reverse offset.

5. An armature-coil, having its two sides equidistant from the axis of the armature, and its ends consisting each of two reversely-directed, oblique portions, one of which lies in the cylindric plane of the adjacent side, and the other of which lies in a concentric plane of less radius.

6. An armature-coil, having its two sides equidistant from the axis of the armature, and its end portions formed of two oblique portions, one of which is in the plane of its adjacent side, and the other of which is offset inwardly from such plane at both its ends.

7. In an armature-coil, having its two sides in the same cylindric plane, and ends having portions which extend obliquely outward from the ends of the respective sides in different planes, and are joined by a radial offset.

8. An armature-winding, composed of a plurality of separable coils, each coil having a side lying side by side in the same slot with the side of another coil, the end connections of the coils lying one within the other in two different planes, each coil having portions lying in each plane and connected to the portions in the other plane by radial offsets.

9. An armature-winding, composed of a plurality of separable coils, each of which has each of its sides lying side by side with the side of another coil in the same plane, adjacent sides having their end connections extending in opposite directions across the ends of the armature and in different planes.

10. An armature-winding composed of a plurality of coils, each of which has its two sides in the same cylindric plane, side by side with an adjacent coil, and ends formed with two reversely-directed oblique portions lying in different planes and connected by a radial offset.

11. An armature-winding, composed of a plurality of separable coils, the sides of all the coils being in the same cylindric plane, and their ends being in two concentric planes, one of which is substantially coincident with the plane of the sides, and the other of which is of a shorter radius, the difference of the length of the radii of the two planes being approximately equal to the depth of a coil.

12. An armature-coil, composed of two straight sides, lying in the same plane, and two ends, each of which consists of two oblique portions connected to each other by a radial offset, and one of which is connected to its adjacent side by a reverse radial offset, the outer wire of said coil at one side of the first-named offset becoming the inner wire at the other side of said offset.

13. An armature-coil, having its two sides connected by two oblique portions, one of which is offset inwardly from its adjacent side, and also from the other of said portions.

14. An armature-coil, consisting of the two sides A and B, and two ends, composed each of the oblique portions C and D, the radial offset $c$, which connects said portions and also transposes the relative positions of the conductors therein, and the offset $d$, which connects the portion D to the side B.

15. The combination with a slotted armature drum or core, of a winding therefor composed of a plurality of similar separable coils, each of which has both of its sides in contact with the bottom of a core-slot, each side of each coil lying side by side in one of said slots with the side of another coil.

16. The combination with a slotted armature drum or core, of a winding therefor, composed of a plurality of similar separable coils, each of which has both of its sides equidistant from the axis of the armature, each side of each coil lying side by side in a core-slot with the side of another coil.

17. The combination with a slotted armature drum or core, of a winding therefor composed of a plurality of similar separable coils having their sides all lying in the same circumferential plane, each side of each coil lying side by side in a core-slot with the side of another coil, the end portions from the two coil sides in each slot extending in opposite directions across the end of the core.

18. The combination with a slotted armature drum or core, of a winding therefor composed of a plurality of similar separable coils having their sides all lying in the same circumferential plane, each side of each coil lying side by side in a core-slot with the side of another coil, the end portions from the two coil sides in each slot extending in opposite directions across the end of the core, and each coil extending from the farther side of one slot to the farther side of another slot.

19. The combination with a slotted armature drum or core, of a winding therefor composed of a plurality of similar separable coils having their sides all lying in the same circumferential plane, each side of each coil lying side by side in a slot with the side of another coil, and each coil extending from the farther side of one slot to the farther side of another slot.

20. In a dynamo-electric machine, a winding composed of detachable counterpart coils the ends of which connect the sides by means of a bend, in the circumferential plane of the sides, an offset toward the axis of the armature, and an offset away from the axis.

21. A drum or cylinder winding having coils in which the so-called "active" portions of any one coil are equidistant from the center of the winding and the end portions of the coils lie in an upper and a lower plane, substantially as described.

22. A drum or cylinder winding having coils in which the "active" portions lie side by side in the slots of a core and equidistant from the center of the winding, the end portions of the coils overlapping one another, substantially as described.

23. A drum or cylinder winding composed of coils in which the "active" portions of the coils lie side by side and one half of the end portions of the coils lie above the other half of the end portions, substantially as described.

24. A drum or cylinder winding having one or more sets of coils, the "active" conductors in any one coil being equidistant from the center of the winding, and the end portions of each coil each lying in two planes unequally distant from such center.

25. A drum or cylinder winding having one or more sets of coils in which the "active" portions of any set of coils are equidistant from the center of the winding, and the end portions of the said coils over and under lie one another in two planes unequally distant from such center, substantially as described.

In testimony whereof I have affixed my signature in presence of two witnesses.

FRANK A. MERRICK.

Witnesses:
   CORA G. COX,
   H. W. SMITH.